Figure 1:
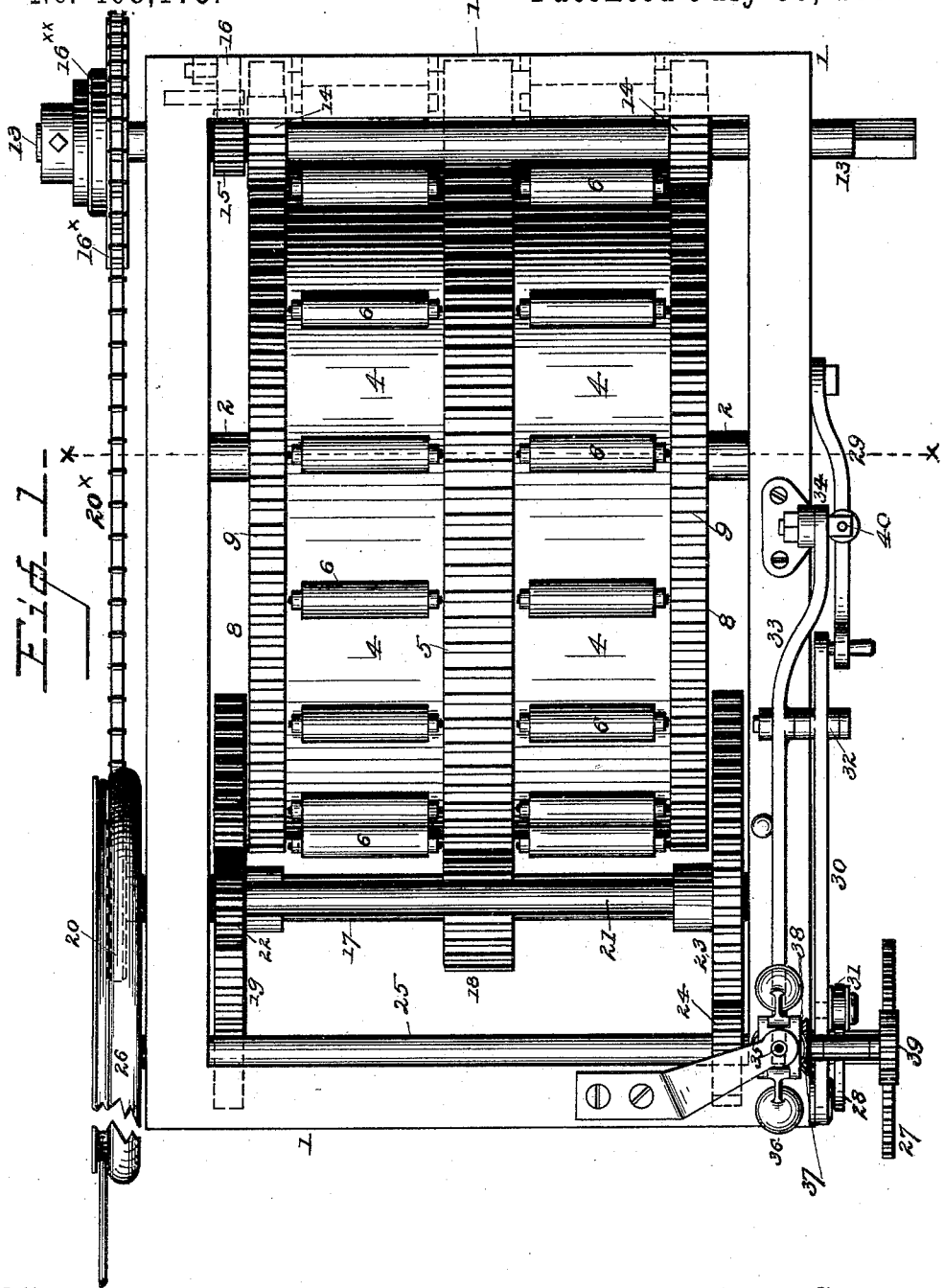

(No Model.) 3 Sheets—Sheet 1.

W. J. GORDON, E. D. GILBERT & D. M. PFAUTZ.
SPRING MOTOR.

No. 408,175. Patented July 30, 1889.

Witnesses
L. Douville
Wm. J. Moore

Inventors.
Wm. J. Gordon
Edmund D. Gilbert
Daniel M. Pfautz
By their Attorneys,
Hiedersheim & Kintner (No Model.) 3 Sheets—Sheet 2.
W. J. GORDON, E. D. GILBERT & D. M. PFAUTZ.
SPRING MOTOR.
No. 408,175. Patented July 30, 1889.
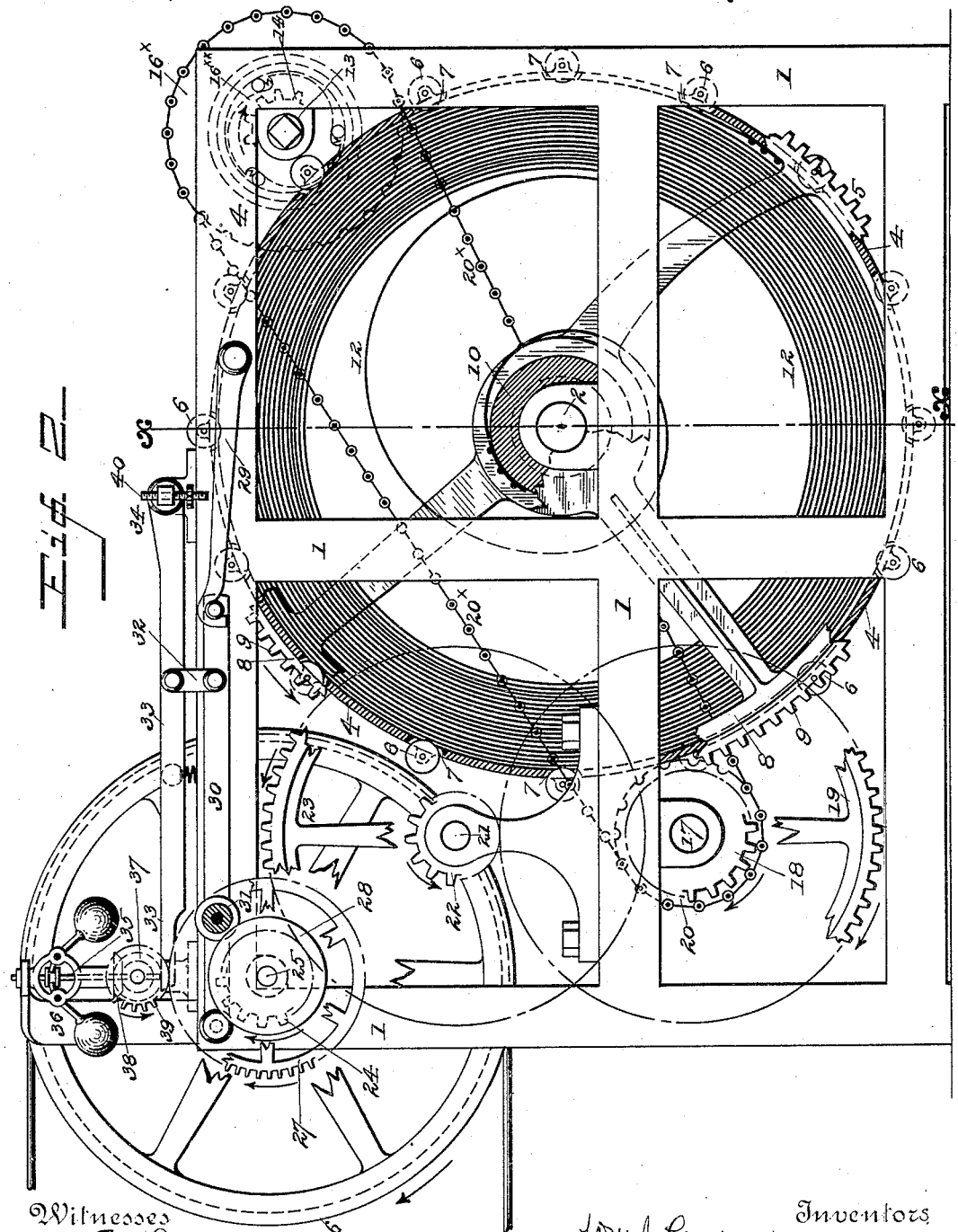

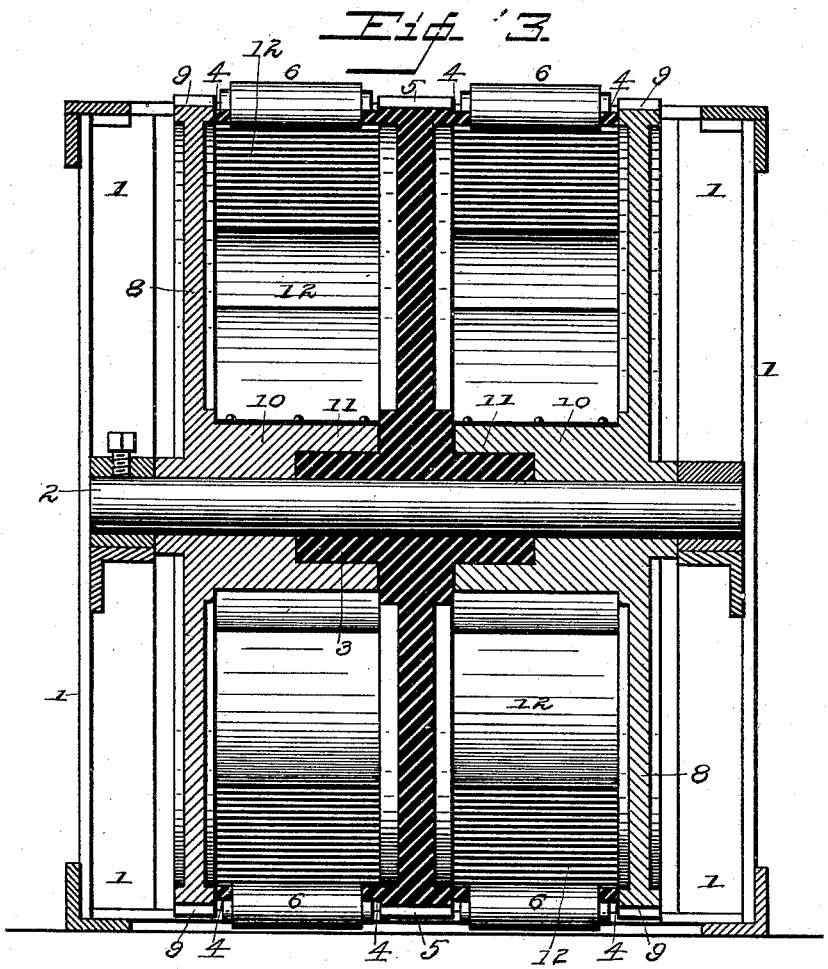

UNITED STATES PATENT OFFICE.

WILLIAM J. GORDON, EDMUND D. GILBERT, AND DANIEL M. PFAUTZ, OF PHILADELPHIA, PENNSYLVANIA, ASSIGNORS TO THE PHILADELPHIA LOCOMOTIVE VEHICLE AND STATIONARY MOTOR COMPANY, OF NEW JERSEY.

SPRING-MOTOR.

SPECIFICATION forming part of Letters Patent No. 408,175, dated July 30, 1889.

Application filed August 30, 1888. Serial No. 284,132. (No model.)

*To all whom it may concern:*

Be it known that we, WILLIAM J. GORDON, EDMUND D. GILBERT, and DANIEL M. PFAUTZ, citizens of the United States, residing in the city and county of Philadelphia, State of Pennsylvania, have invented new and useful Improvements in Spring-Motors, which improvement is fully set forth in the following specification and accompanying drawings.

Our invention relates to improvements in spring-motors, and has for its object a device so constructed that the power generated by the uncoiling of the spring is utilized to operate or rewind portion of the spring, whereby the time of the uncoiling thereof is lengthened.

To accomplish this object the invention consists in a motor formed of two wheels, a coiled spring secured at one end to the hub of one of the wheels and having its opposite end secured to the inner wall of the rim of the other wheel, and mechanism, substantially as described, consisting of shafts and pinions connected with the toothed peripheries of the wheels, whereby the power generated by the uncoiling of the spring and the movement of one of the wheels causes a differential rotation of the other wheel in the same direction.

It further consists in the combination of parts, all as hereinafter described and specifically claimed.

Figure 1 represents a top or plan view of a spring-motor constructed in accordance with and embodying our invention. Fig. 2 represents a side elevation thereof, taken from the right-hand side of the motor. Fig. 3 represents a vertical transverse sectional view thereof on line $x\ x$ of Fig. 1.

Similar numerals of reference indicate corresponding parts in the several figures.

Referring to the drawings, the numeral 1 designates the frame-work of the machine. In the frame-work is rigidly mounted a shaft 2. On the shaft 2 is loosely mounted the hub 3 of a wheel or casing 4. The wheel or casing is provided with gear-teeth 5 on its periphery and has friction-rollers 6 journaled in openings or slots 7 of said periphery, the purpose of which is to prevent binding of the springs as they unwind.

8 designates wheels having gear-teeth 9, and having their hubs 10 loosely mounted on the shaft 2 and the hub of the casing, the hubs 10 being recessed or socketed at 11 to receive the ends of hub 3 of the casing, as clearly shown in Fig. 3 of the drawings.

12 12 designates flat coiled springs, two of which are employed, and one end of each of said springs is secured to one of the hubs 10 of wheels 8, and the other ends thereof are secured to the inside of the band or rim of the drum or casing.

From this construction it will be seen that the springs are connected to the hubs of the winding-wheels 8 and the rim of the casing or drum, whereby, when said springs exert their force, they revolve the drum or casing and transmit motion from said casing or drum.

13 designates a shaft mounted in the frame-work and carrying gear-wheels 14, which mesh with the gear-teeth 9 on wheels 8, and the shaft 13 also carries a check or safety-ratchet 15, adapted to be engaged by a pawl or dog 16 and a sprocket-wheel $16^\times$ and friction-clutch $16^{\times\times}$. The shaft 13 is what may be termed a "winding-shaft," as by turning said shaft the gear-wheels 14 cause the wheels 8 to revolve, and thus wind the springs around the hubs 10 thereof. It will also be understood that by reason of the springs having one end secured to the hubs 10 of wheels 8, on which they are wound, and their other end secured to the casing, when said springs unwind they revolve the said casing.

17 designates a shaft mounted in the frame-work carrying a gear-wheel 18, which meshes with the gear-teeth 5 on the casing, and said shaft 17 also carries gear-wheel 19 and sprocket-wheel 20, and over the sprocket-wheels 20 and $16^\times$ passes a sprocket-chain $20^\times$.

21 designates a shaft mounted in the frame-work and carrying a gear-wheel 22, meshing with gear-wheel 19, and also carrying a gear-wheel 23, meshing with gear-wheel 24 on a shaft 25. The shaft 25 has the driving-pulley 26, gear-wheel 27, and a friction-wheel 28.

The operation is as follows: The springs are wound in the manner described, and motion is transmitted through the medium of gear-teeth 5, gear-wheels 18, 19, 22, 23, and 24 to the driving-pulley which runs the machinery, as will be readily understood. The sprocket-wheel 20 transmits motion by means of the chain $20^\times$ to the sprocket-wheel $16^\times$ on the winding-shaft, thus causing said shaft to revolve, and by means of wheels 14 and toothed rim 9 so turn the hubs 10 that the inner ends of the springs are rotated around said hubs, thereby retaining the tension of the coil of the springs and increasing the extent of action of the same, and consequently their duration of time of unwinding.

We employ the following mechanism for governing the speed of the motor and for stopping the same when desired:

29 designates a lever pivoted at its outer end to the frame and having its inner end connected to the inner end of the lever 30, which is pivoted at its outer end to the frame and carries a friction-roller 31, which bears against the friction-roller 28 on the shaft 25. The lever 30 is connected by means of a link 32 with a lever 33, pivoted at 34 and having its free end resting under the vertical governor-shaft 35 of the governor 36. The governor is rotated by means of bevel-gear 37 and 38 and the gear-wheel 39, meshing with the gear-wheel 27 on shaft 25.

40 designates a screw adapted to engage the lever 29, which being connected with lever 30 presses said lever 30 downward to cause the friction-roller 31 thereon to impinge the friction-roller 28 for stopping the motor or for regulating the speed thereof. From this construction it will be seen that the screw 40 will cause the friction-roller 31 to impinge the roller 28 and stop the machine, or impinge only sufficient to regulate the speed of the motor, as described.

The operation of this mechanism is as follows: When the motor is running, the parts are in the position shown in Fig. 2 of the drawings, and should the tendency of the motor be to run the machinery at a greater speed than desired the balls of the governor would be thrown up, causing the vertical shaft to descend, press the end of the lever 33 down, and consequently the lever 30, connected with it, thus causing the friction-roller 31 to press against the friction-roller 28, and thereby regulate the speed of the driving-pulley. When it is desired to stop the motor, the screw 40 is caused to force the lever 29 down, which, by reason of its connection with lever 30, presses the friction-roller 31 against roller 28 and stops the motor, as is evident, and to start the same it is merely necessary to release the contact of the screw 40 with lever 29.

It will be understood that by having the springs arranged on each side of the casing and the gear-teeth in the center thereof the casing is perfectly balanced and transmits motion steadily, smoothly, and easily.

The friction-clutch $16^{\times\times}$ may be of any desired character, and to the construction of the same we make no claim. By the automatic differential action of the drum and the wheel, respectively connected with the two ends of the spring, the time of uncoiling or unwinding of the same is lengthened, the difference between the speed of the said drum and wheel determining the length of time of the uncoiling of the spring. It will be noticed that owing to the rotation of the drum and wheel in the same direction the spring may be wound by hand or otherwise during the working of the motor.

Having thus described our invention, what we claim as new, and desire to secure by Letters Patent, is—

1. In a motor, the combination of a frame, a shaft rigidly mounted thereon, a casing or drum on said shaft, wheels mounted on said shaft and having their hubs recessed or socketed to receive the hub of the casing or drum, and springs having one end connected to the hubs of the wheels and their other ends connected to the casing, whereby motion is imparted by the springs to the casing, in the manner and for the purpose described.

2. In a motor, the combination of the casing or drum having friction-rollers journaled in the periphery thereof, the wheels having their hubs recessed to receive the hub of the casing, and the springs on each side of the casing having one end attached to the hubs of the wheels, and the other end connected to the casing, substantially as and for the purpose set forth.

3. In a motor, the combination of a shaft, a casing or drum mounted on said shaft, wheels mounted on said shaft and having gear-teeth, springs connected to the wheels and casing, and a shaft having gear-wheels meshing with the gear-teeth on the wheels for winding the springs, substantially in the manner and for the purpose described.

4. In a motor, the combination of the casing having gear-teeth, wheels having gear-teeth, springs connected with the wheels and casing, a shaft having gear-wheels meshing with the gear-teeth on the wheels, and a gear-wheel meshing with the teeth on the casing, substantially in the manner and for the purpose described.

5. In a motor, the combination of the winding-shaft having the gear-wheels and sprocket-wheels thereon, the wheels having gear-teeth meshing with said gear-wheels, the casing having gear-teeth, the springs connected with the wheels and casing, the shaft having the gear-wheel meshing with the gear-teeth on the casing, the sprocket-wheel on said shaft, and the sprocket-chain passing over said sprocket-wheel and sprocket-wheel of the winding-shaft to revolve said shaft, substantially as and for the purpose described.

6. In a motor, the combination of the casing having the gear-teeth on the outer surface thereof, the gear-wheel 18, meshing therewith, and the gears 19, 22, 23, 24, and 27, for operating the driving-pulley and governor, substantially in the manner and for the purpose set forth.

7. In a motor, the combination of the gear-wheel 23, the gear-wheel 24, meshing therewith, the shaft 25, carrying said gear-wheel 24, the gear-wheel 27, the gear-wheel 29, meshing therewith for operating the governor, the roller 28, and the friction-roller 31, substantially as described.

8. In a motor, the combination of the lever 29, the lever 30, connected therewith and carrying a friction-roller 31, the friction-roller 28, and the screw 40, operating in the manner and for the purpose described.

9. In a motor, the combination, with the governor-shaft, of the lever 33, lever 30, connected therewith and carrying a friction-roller 31, and the friction-roller 28 on shaft 25, operating substantially in the manner and for the purpose described.

10. In a motor, the casing or wheel 4, having slots 7 in its periphery, rollers journaled in the walls of said slots and extending transversely of the diameter of the casing or wheel, and a coil-spring within said casing and bearing against the said rollers, said parts being combined substantially as described, whereby the binding of the spring is prevented.

11. In a motor, the combination, with the casing having the gear-teeth, of the shaft having the gear-wheel meshing with said gear-teeth, the sprocket-wheel on said shaft, the winding-shaft having a sprocket-wheel and a chain passing over said sprocket-wheels, whereby the rotation of the gear-wheel which meshes with the casing turns the winding-shaft, and a friction-clutch on said shaft to prevent a retarding movement of the winding-shaft, in the manner and for the purpose described.

12. In a spring-motor, a shaft having a drum loosely mounted thereon, the said drum being provided with teeth on its periphery, a toothed wheel loosely mounted on said shaft, a spring secured at one end to the hub of the wheel and at the other end to the inner face of the casing of the drum, and mechanism consisting of rotary shafts, meshing gear-wheels, and sprocket-wheels with chain-connections, substantially as described, connected to said drum and wheel, whereby the rotation of the drum in one direction revolves the wheel in the same direction, said parts being combined substantially as and for the purpose set forth.

13. In a spring-motor, a shaft with a drum and a wheel loosely mounted thereon, a coil-spring connected at one end to the inner casing of the drum and at the other end with the hub of the wheel, and gearing connected with said drum and wheel, whereby different rates of speed are communicated to said drum and wheel, respectively, substantially as and for the purpose set forth.

14. An automatic differential spring-motor having an operating-spring with drum and wheel, respectively connected with the ends thereof, and freely mounted on a shaft, gearing connected with said drum and wheel and adapted by the unwinding of the spring to rotate the said wheel in the same direction, but at a less rate of speed than the drum, said parts being combined substantially as described.

WILLIAM J. GORDON.
EDMUND D. GILBERT.
DANIEL M. PFAUTZ.

Witnesses:
JOHN A. WIEDERSHEIM,
WM. N. MOORE.